United States Patent [19]

Asberg

[11] 4,396,236

[45] Aug. 2, 1983

[54] BEARING UNIT

[75] Inventor: Sture Åsberg, Gothenburg, Sweden

[73] Assignee: SKF Indutries, Inc., King of Prussia, Pa.

[21] Appl. No.: 303,428

[22] Filed: Sep. 18, 1981

[30] Foreign Application Priority Data

Nov. 6, 1980 [SE] Sweden .............................. 8007796

[51] Int. Cl.³ ...................... F16C 33/78; F16C 13/02
[52] U.S. Cl. ................................. 308/187.1; 308/191
[58] Field of Search ................... 308/187.1, 190, 191, 308/189 R, 207 R, 208, 210

[56] References Cited

U.S. PATENT DOCUMENTS 2,636,221  4/1953  Meadows et al. ................. 308/190
3,884,331  5/1975  Asberg ........................... 308/191 X
3,957,319  5/1976  Gorski ......................... 308/207 R X

*Primary Examiner*—Stuart S. Levy
*Assistant Examiner*—David Werner
*Attorney, Agent, or Firm*—Eugene E. Renz, Jr.

[57] ABSTRACT

The invention refers to a bearing unit for driven or non-driven wheels of vehicles. The unit incorporates an inner member (5), an outer member (1) with intermediary rolling bodies (2) and retainer (10) and seals (11). The inner member (5) is provided with a flange-like member (7) for attachment of the unit to a wheel or to a vehicle. The invention is characterized thereby that the flange-like member (7), which extends radially outside the rolling bodies (2), has recesses (14), which make it possible to mount and inspect the retainer (10) and/or the seal (11) from the exterior of the flange-like member (7).

6 Claims, 3 Drawing Figures

BEARING UNIT

BACKGROUND AND SUMMARY OF THE INVENTION

The present invention refers to a bearing unit for driven or non-driven wheels of vehicles or the like.

Wheels e.g. for motor cars are conventionally supported on rolling bearings arranged on a shaft pivot. As such an assembly it is necessary accurately to machine a number of contact surfaces of the bearings, the shaft pivot or the surrounding housing or hub and to adjust the bearings to a correct preload in situ.

In later years it has been suggested to substitute the conventional supporting method by arranging a bearing unit, which incorporates bearing as well as wheel hub. This unit can be attached directly to a supporting portion of the vehicle and the wheel can be fitted directly to the part of the unit intended for rotation. A plurality of types of such units are presently known, and one of them is described e.g. in British Patent Specification No. 1.519.048.

The unit described in this patent consists of a rotatable inner member 3, a stationary outer member 2 and a two-row angular contact ball bearing 10. The bearing as shown is provided with a double retainer 11, which encloses both rows of balls. The unit is furthermore provided with two seals 12 and 13 of which seal 13 has been given a particular design, whereas the easily accessible seal 12 is of conventional type.

In assembling a bearing unit of this type, it is necessary to use the so called Konrad assembly, which means that the outer and inner rings are given an eccentric position in relation to each other during the introduction of the balls, whereupon the rings are brought to concentric position relative to each other and the retainer is inserted from one side, i.e. from the right hand side as shown in the drawing figure. It is thus necessary that the retainer is of the so called snap-type. It is also necessary that the seal 13 is made of such an elastic material that it will not impede an eccentric dislocation of the outer and inner rings relative to each other during the introduction of the balls. It is easily realized at a glance at the drawings that the seal 13 must be fixed to the outer ring 2 prior to the assembly of the bearing unit.

It has since long been a desideratum to be able to use a conventional seal at this bearing unit also in the space adjacent the inner and outer race rings, and to be able to use a separate retainer for each row of balls. A common seal, as for example the seal 12 is rigid, and it can therefore not be fixed to the outer ring prior to a Konrad-assembly, since it will prevent an eccentric dislocation of the inner and outer rings relative to each other. A further study of the drawings of said specification shows furthermore that it is impossible to introduce a retainer for the left hand row of balls, as there is no space for displacing the retainer to the left prior to the assembly.

This problem has according to the present invention been solved and it has been provided a bearing unit for driven or non-driven wheels of vehicles or the like, which incorporates a radially inner member and a radially outer member have confronting raceways for a plurality of rolling bodies or elements, retainer and seals arranged therebetween, whereby at least the radially inner member is provided with flange-like members for attachment of the unit to the wheel or the vehicle or the like, and which is characterized thereby that the flange-like member, which extends radially outwardly beyond the rolling bodies, is provided with recesses which make possible mounting and inspection of retainer and/or seals from the exterior of the flange-like member.

Further features of the invention are defined in the sub-claims.

By means of the present invention is it possible by aid of a simple tool to push the retainer and the seal, or if a double retainer is used, only the seal, into the bearing from the flange side.

As to the seal it is besides the simplfied assembly also gained that it is possible to use a rigid seal of conventional type, as the seal does not have to be inserted during the Konrad-assembly.

DESCRIPTION OF THE DRAWINGS

The invention will hereinafter be further described with reference to the drawings, in which.

DESCRIPTION OF THE PREFERRED EMBODIMENTS

Figure 1:
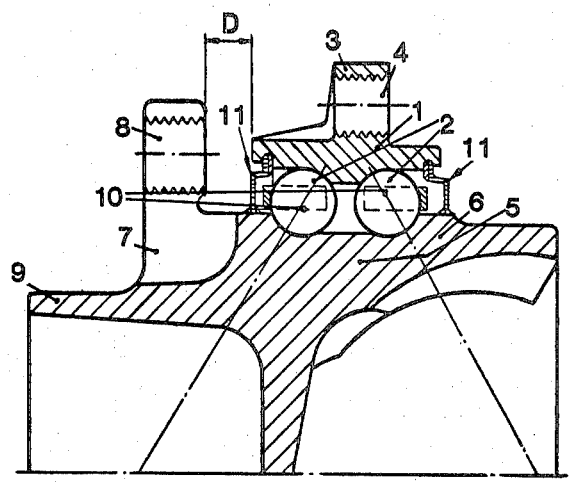
FIG. 1 shows a section through an embodiment of the invention.

In FIG. 1 is shown a bearing unit having an outer race ring 1, which is common for both ball rows 2 of a two-row angular contact ball bearing. The outer race ring is equipped with a flange 3 provided with bolt bores 4 for the attachment to the vehicle.

Inside the ball rows 2 there is arranged an inner rotatable member 5, which incorporates one half of a driving joint 6 and a flange-like member 7. The inner and outer rotatable members have confronting raceways for the rolling elements. The flange-like member 7 is equipped with bolt bores for fitting of wheel and brake disc. For guiding the wheel and the brake disc there is provided a tubular projection 9 at the inner member 5.

Both rows of balls are retained in position by means of similar single retainers 10, which are each snapped onto the ball rows one from each direction. Similar seals 11 at each side of the ball rows prevent penetration of dirt and the like into the annular space for the rolling elements. As shown in the figure the distance D between the flange-like member 7 and the outer race ring 1 has been made so large that there is room for a retainer 10 between the flange-like member 7 and the ball row shown to the left in the drawing. The retainers and seals are during the inserting of the balls retracted in opposite directions in the drawings.

Figure 2:
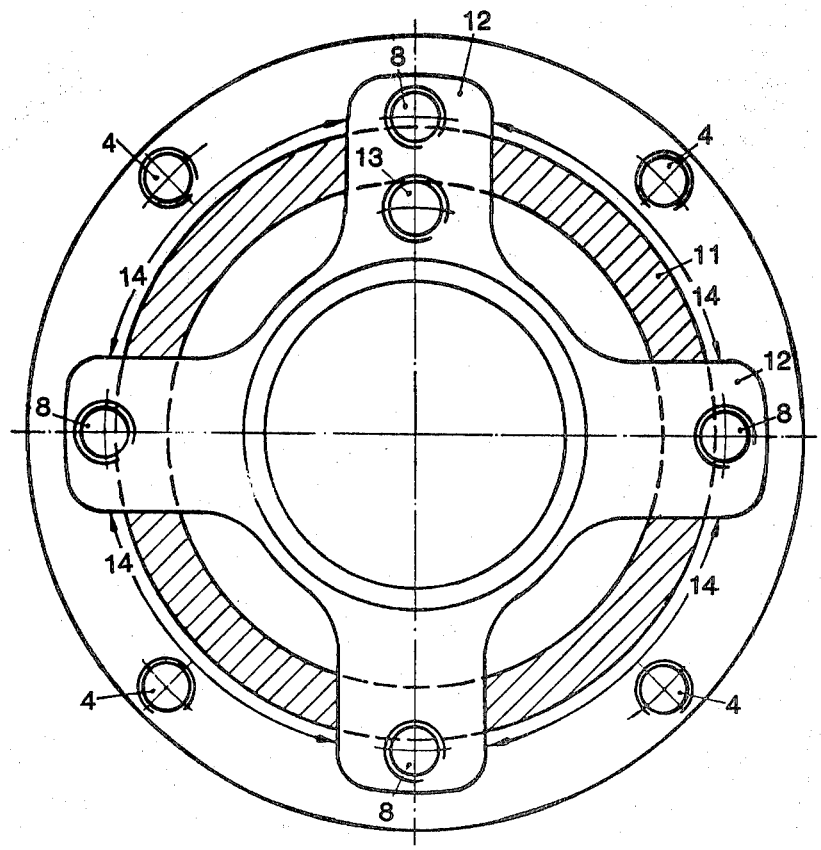
FIG. 2 shows the same embodiment as seen from the side thereof.

In FIG. 2 is more clear shown how the flange-like member 7 consists of a plurality of circumferentially spaced lugs 12 with intermediate recesses 14 which expose and permit access to the seals and retainers from exteriorly of the flange member 7. Other reference numerals are the same as those in FIG. 1. It is evident that it is easy to reach the seal 11, which is almost completely exposed on the drawing, through the recesses 14.

In one of the attachment lugs 12 there has been drilled a bore 13 for attachment of a conventional brake disc or brake drum (not shown), so that the wheel can be removed independently.

Figure 3:
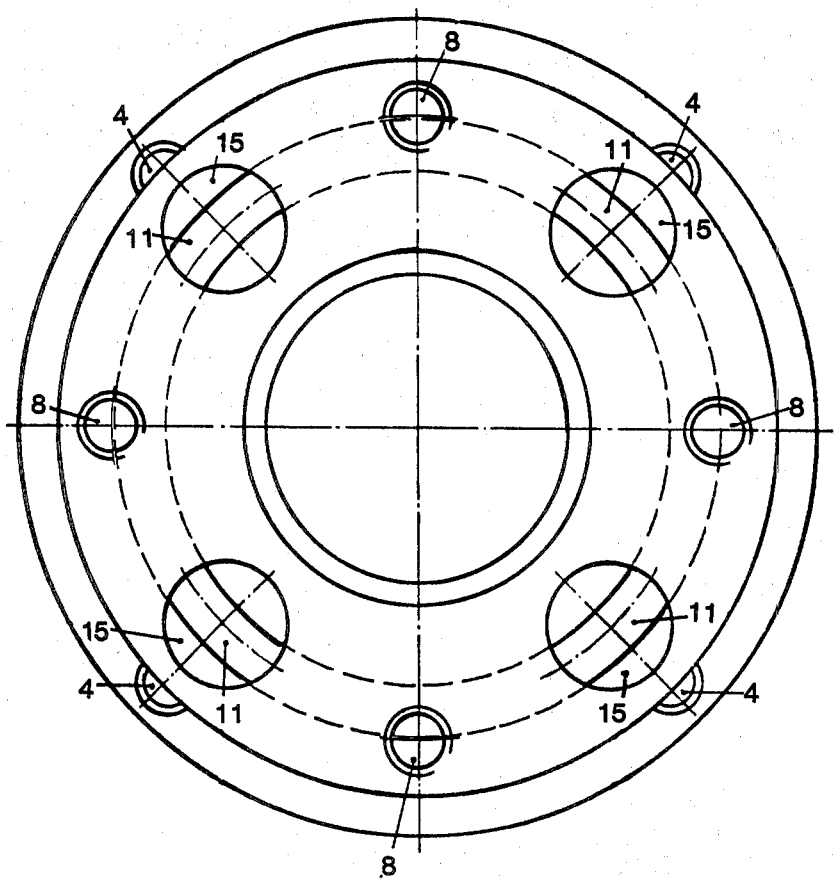
FIG. 3 shows a second embodiment as seen from the side.

FIG. 3 shows another embodiment of the invention, in which the flange-like member more clearly has been made in form of a flange and where recesses 14 in form of openings in the flange have been arranged to give access for pushing retainer and seal 11 into the bearing.

The device according to the present invention gives, as already mentioned, the advantage as compared to earlier similar devices that single retainers and standardized, rigid seals can be used and that the assembly will thus be simple and easy to assemble and disassemble. As the flange-like member consists of four lugs only it is furthermore achieved the advantage, that the heat transfer from brake disc or brake drum to the bearing will be less than with earlier similar designs. This depends on a smaller metallic contact surface between flange and brake disc or brake drum and a better air cooling in the larger space between the flange and ball rows. Due to the fact that the flange has been provided with large recesses the weight will be lower. At the dimension shown in the drawings an amount of about 0,7 kg of steel is saved as compared with a flange having no other recesses than the bolt bores.

The invention is not limited to the embodiments shown but can be modified in different ways within the scope of the claims.

What is claimed is:

1. A bearing unit for driven or non-driven wheels of vehicles comprising inner and outer relatively rotatable members having confronting spaced raceways for a plurality of rolling elements, seal means adjacent opposite ends of an annular space between said inner and outer members, said inner member having a flange-like portion for mounting the bearing unit to the wheel or the vehicle, said flange-like portion comprising a hub located radially inwardly of the annular space and being of a configuration defining a plurality of circumferentially spaced lugs extending radially outwardly from the hub in a spoke-like array, said lugs defining a plurality of relatively large open areas, said lugs projecting radially beyond the rolling elements and spaced axially from said seal means a predetermined distance to permit mounting of said seal means, said lugs having means for mounting the wheel or vehicle thereto and means defining open areas between the lugs facilitating inspection or mounting of said seal means from exteriorly of said flange-like portion.

2. A bearing unit as claimed in claim 1 including at least one retainer for circumferentially spacing the rolling elements.

3. A bearing unit according to claim 1, characterized thereby, that the radially inner member incorporates one half of a driving joint.

4. A bearing unit according to claim 1, characterized thereby, that the radially inner member is provided with a tubular projection for guiding of wheel and possibly brake disc or brake drum.

5. A bearing unit as claimed in claim 1 wherein the rolling elements comprise two axially spaced rows of balls which together with the inner and outer members form a double row angular contact ball bearing.

6. A bearing unit as claimed in claim 1 wherein said lugs are provided with bores for bolt fasteners for mounting the wheel of a vehicle and said outer member includes a flange for bores for bolts for attachment of the outer member to the vehicle.

* * * * *